US012171038B2

(12) United States Patent
Gurumoorthy et al.

(10) Patent No.: US 12,171,038 B2
(45) Date of Patent: *Dec. 17, 2024

(54) IMPLICIT RADIO RESOURCE CONTROL STATE TRANSITIONS

(71) Applicant: Apple Inc., Cupertino, CA (US)

(72) Inventors: Sethuraman Gurumoorthy, San Jose, CA (US); Srirang A Lovlekar, Cupertino, CA (US); Murtaza A. Shikari, Mountain View, CA (US); Srinivasan Nimmala, San Jose, CA (US); Haijing Hu, Beijing (CN); Fangli Xu, Beijing (CN); Yuqin Chen, Shenzhen (CN); Longda Xing, San Jose, CA (US); Xu Ou, San Jose, CA (US); Li Su, San Jose, CA (US); Vijay Venkataraman, Sunnyvale, CA (US); Dawei Zhang, Saratoga, CA (US); Muthukumaran Dhanapal, Dublin, CA (US); Sree Ram Kodali, Sunnyvale, CA (US); Srinivas Burugupalli, Union City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/464,076

(22) Filed: Sep. 8, 2023

(65) Prior Publication Data

US 2023/0422339 A1  Dec. 28, 2023

Related U.S. Application Data

(63) Continuation of application No. 17/482,950, filed on Sep. 23, 2021, now Pat. No. 11,792,878, which is a
(Continued)

(51) Int. Cl.
| | | |
|---|---|---|
| H04W 76/27 | (2018.01) | |
| H04W 76/28 | (2018.01) | |
| H04W 76/38 | (2018.01) | |

(52) U.S. Cl.
CPC ............ *H04W 76/27* (2018.02); *H04W 76/28* (2018.02); *H04W 76/38* (2018.02)

(58) Field of Classification Search
CPC ..... H04W 76/27; H04W 76/28; H04W 76/38; H04W 76/19; H04W 68/00; H04W 52/02;
(Continued)

(56) References Cited

U.S. PATENT DOCUMENTS

| | | |
|---|---|---|
| 8,213,947 B2 | 7/2012 | Plestid |
| 9,271,326 B2 | 2/2016 | Kotecha |

(Continued)

FOREIGN PATENT DOCUMENTS

| | | |
|---|---|---|
| CN | 101426278 | 5/2009 |
| CN | 102625421 | 8/2012 |

(Continued)

OTHER PUBLICATIONS

Nokia Networks: "Further details on autonomous state transition and text proposal", 3GPP Draft; R2-150223_EDL_TRANSITION_V05, 3RD Generation Partnership Project (3GPP), Mobile Competence Centre ; 650, Route Des Lucioles ; F-06921 Sophia-Antipolis Cedex ; France, vol. RAN WG2, No. Athens, Greece; 20150 (Year: 2015).*

(Continued)

*Primary Examiner* — Hardikkumar D Patel
(74) *Attorney, Agent, or Firm* — Kowert, Hood, Munyon, Rankin & Goetzel, P.C.

(57) ABSTRACT

This disclosure relates to performing implicit radio resource control state transitions in a cellular communication system. A wireless device may establish a radio resource control
(Continued)

(RRC) connection with a cellular base station. A data inactivity timer length and a target RRC state for implicit RRC transitions may be determined. A data inactivity timer having the determined data inactivity timer length may be initiated. It may be determined that the data inactivity timer has expired. The wireless device may transition to the target RRC state based at least in part on determining that the data inactivity timer has expired.

20 Claims, 9 Drawing Sheets

Related U.S. Application Data continuation of application No. 16/264,885, filed on Feb. 1, 2019, now Pat. No. 11,166,336.

(60) Provisional application No. 62/629,776, filed on Feb. 13, 2018.

(58) Field of Classification Search
CPC ... H04W 68/005; H04W 36/04; H04W 36/28; H04W 88/06; H04W 84/12; H04W 76/04; H04W 80/08; H04W 72/08; H04W 92/10; H04W 88/02; H04W 88/12; H04W 72/042; H04W 36/00; H04W 24/10; H04W 36/08; H04W 36/22; H04W 36/0058; H04W 28/02; H04W 28/16; H04W 76/12; H04W 28/0263; H04W 72/085; H04W 36/30; H04W 76/16; H04W 36/00837; H04W 36/0088; H04W 36/0027; H04W 36/0069; H04W 8/20; H04W 28/08; H04W 4/70; H04W 48/06; H04W 76/18; H04W 28/0289; H04W 74/08

See application file for complete search history.

(56) References Cited

U.S. PATENT DOCUMENTS

| | | | |
|---|---|---|---|
| 9,432,998 | B2 | 8/2016 | Maniatis |
| 9,999,095 | B2 | 6/2018 | Kweon |
| 2015/0003361 | A1 | 1/2015 | Palat |
| 2017/0265243 | A1* | 9/2017 | Hahn ............... H04W 76/38 |
| 2019/0166553 | A1* | 5/2019 | Ryoo ............... H04W 76/28 |
| 2020/0100312 | A1* | 3/2020 | Hapsari ............ H04W 76/27 |

FOREIGN PATENT DOCUMENTS

| | | |
|---|---|---|
| CN | 102740502 | 10/2012 |
| CN | 103874139 | 6/2014 |
| CN | 104754759 | 7/2015 |
| CN | 105165108 | 12/2015 |
| CN | 105188110 | 12/2015 |
| CN | 106465451 | 2/2017 |
| CN | 107249221 | 10/2017 |
| CN | 107484260 | 12/2017 |
| EP | 2863704 | 4/2015 |
| WO | 2013113466 | 8/2013 |

OTHER PUBLICATIONS

Office Action for CN Patent Application No. 201980013029.4; Dec. 2, 2022.

International Search report and Written Opinion for Application No. PCT/US2019/017515; Jul. 12, 2019.

"3rd Generation Partnership Project; Technical Specification Group Radio Access Network; Downlink enhancements for UMTS (Release 13)"; 3GPP Standard; Technical Report; 3GPP TR 25.706, 3rd Genration Partnership Project (3GPP), RAN WG6, v13.0.0; Jul. 8, 2015.

Nokia Networks "Further details on autonomous state transition and text proposal"; 3GPP TSG-RAN WG2 Meeting #89 R2-150223; Feb. 9, 2015.

Huawei et al. "Timer based state transition from Connected to Inactive"; 3GPP TSG-RAN WG2 Meeting AH 1801 R2-1800494; Jan. 22, 2018.

* cited by examiner

IMPLICIT RADIO RESOURCE CONTROL STATE TRANSITIONS

PRIORITY INFORMATION

This application is a continuation of U.S. patent application Ser. No. 17/482,950, entitled "Implicit Radio Resource Control State Transitions," filed Sep. 23, 2021, which is a continuation of U.S. patent application Ser. No. 16/264,885, entitled "Implicit Radio Resource Control State Transitions," filed Feb. 1, 2019, now U.S. Pat. No. 11,166,336 issued on Nov. 2, 2021, which claims priority to U.S. provisional patent application Ser. No. 62/629,776, entitled "Implicit Radio Resource Control State Transitions," filed Feb. 13, 2018, which is hereby incorporated by reference in its entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communications, and more particularly to systems, apparatuses, and methods for performing implicit radio resource control state transitions in a cellular communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications.

To increase coverage and better serve the increasing demand and range of envisioned uses of wireless communication, in addition to the communication standards mentioned above, there are further wireless communication technologies under development, including 3GPP fifth generation (5G) new radio (NR) communication. Accordingly, improvements in the field in support of such development and design are desired.

SUMMARY

Embodiments are presented herein of apparatuses, systems, and methods for performing implicit radio resource control state transitions in a cellular communication system.

In some cellular communication systems, there may be several possible radio resource control (RRC) states in which a wireless device can operate. For example, in addition to a RRC connected state, in 5G NR it may also be possible to operate in a RRC idle or RRC inactive state, at least according to some embodiments. In such a scenario, e.g., with multiple options when being released from the RRC connected state, it may be useful to provide a mechanism for a wireless device to indicate its preference for which RRC state it would like to target for entry when being released from the RRC connected state, and/or for a cellular network to direct a wireless device served by the network to which RRC state the wireless device should transition when being released from the RRC connected state. Accordingly, such a mechanism is described herein, according to some embodiments.

Additionally, at least in some cellular deployment scenarios, it is envisioned that there may be very high densities of wireless devices, many of which may only occasionally or periodically wish to communicate small amounts of data. In such a case, simply performing over the air signaling for RRC connection release messages may represent a substantial signaling burden. Accordingly, techniques are described herein for utilizing an implicit mechanism for performing RRC connection release, which may reduce the signaling burden in such scenarios (among other possible scenarios), and may potentially also allow at least some wireless devices to reduce overall power consumption by potentially speeding their transitions from a RRC connected state to a more power-efficient RRC inactive or RRC idle state once any intended data transaction(s) are complete.

Techniques are also described herein for a wireless device to negotiate to determine a preferred discontinuous reception cycle length for use by the wireless device in the RRC inactive state, e.g., that may potentially be different than a discontinuous reception cycle length configured for use by the wireless device in the RRC idle state. Providing a mechanism for such negotiation may allow a wireless device to more dynamically manage its configuration, and/or may assist the network to distinguish between devices in different RRC states with different paging periodicity and allocate DRX durations commmensurate with device capabilities/types, e.g., to distribute page load more evenly.

Such techniques may be used individually or in any combination, as desired. A wireless device that implements such techniques may, at least in some instances, reduce the data transfer latency experienced by wireless devices, reduce the need for downlink signaling, and/or enable faster transitions to power efficient operating states, according to various embodiments.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
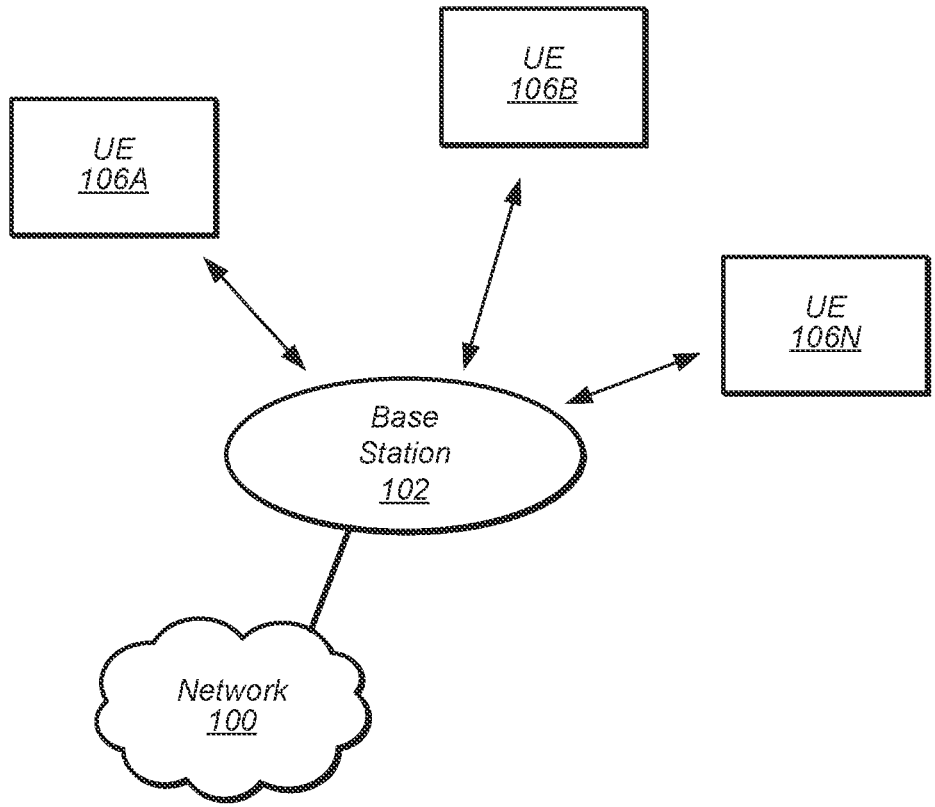
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
RRC: Radio Resource Control
DRX: Discontinous Reception
TX: Transmission/Transmit
RX: Reception/Receive
NW: Network
LAN: Local Area Network
WLAN: Wireless LAN
AP: Access Point
RAT: Radio Access Technology
IEEE: Institute of Electrical and Electronics Engineers
Wi-Fi: Wireless Local Area Network (WLAN) RAT based on the IEEE 802.11 standards Terms The following is a glossary of terms that may appear in the present application:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
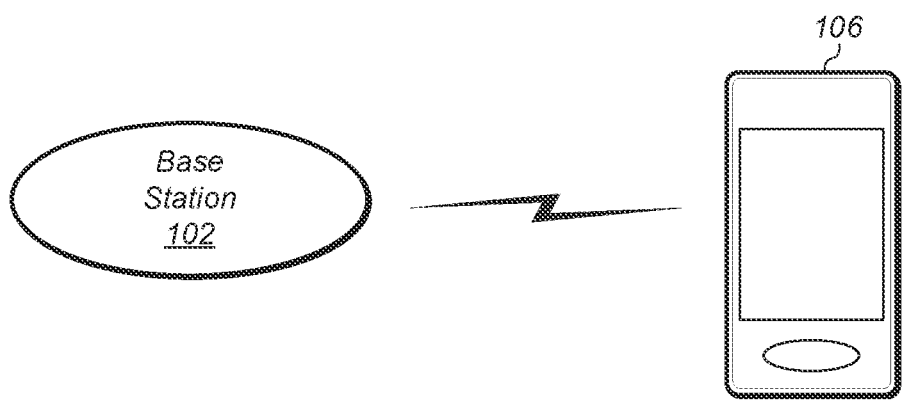
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform implicit radio resource control state transitions, at least according to the various methods as described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM, etc.), and separate radios for communicating using each of Wi-Fi and BLUETOOTH™. Other configurations are also possible.

Figure 3:
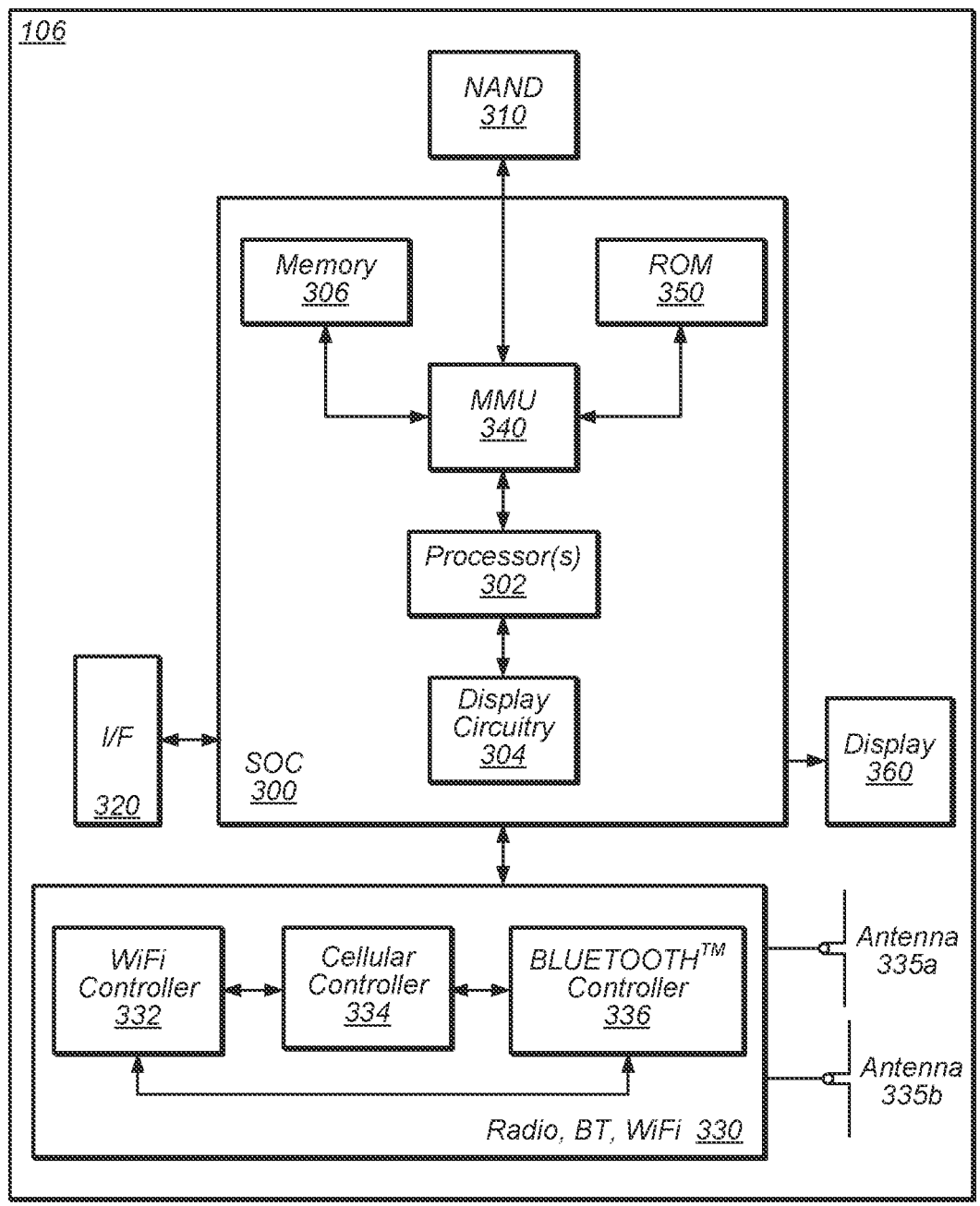
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

As described further subsequently herein, the UE 106 (and/or base station 102) may include hardware and software components for implementing methods for at least UE 106 to perform implicit radio resource control state transitions in a cellular communication system. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform implicit radio resource control state transitions in a cellular communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 332, a cellular controller (e.g., NR controller) 334, and BLUETOOTH™ controller 336, and in at least some embodiments, one or more or all of these controllers may be implemented as respective integrated circuits (ICs or chips, for short) in communication with each other and with SOC 300 (and more specifically with processor(s) 302). For example, Wi-Fi controller 332 may communicate with cellular controller 334 over a cell-ISM link or WCI interface, and/or BLUETOOTH™ controller 336 may communicate with cellular controller 334 over a cell-ISM link, etc. While three separate controllers are illustrated within radio 330, other embodiments have fewer or more similar controllers for various different RATs that may be implemented in UE device 106.

Figure 4:
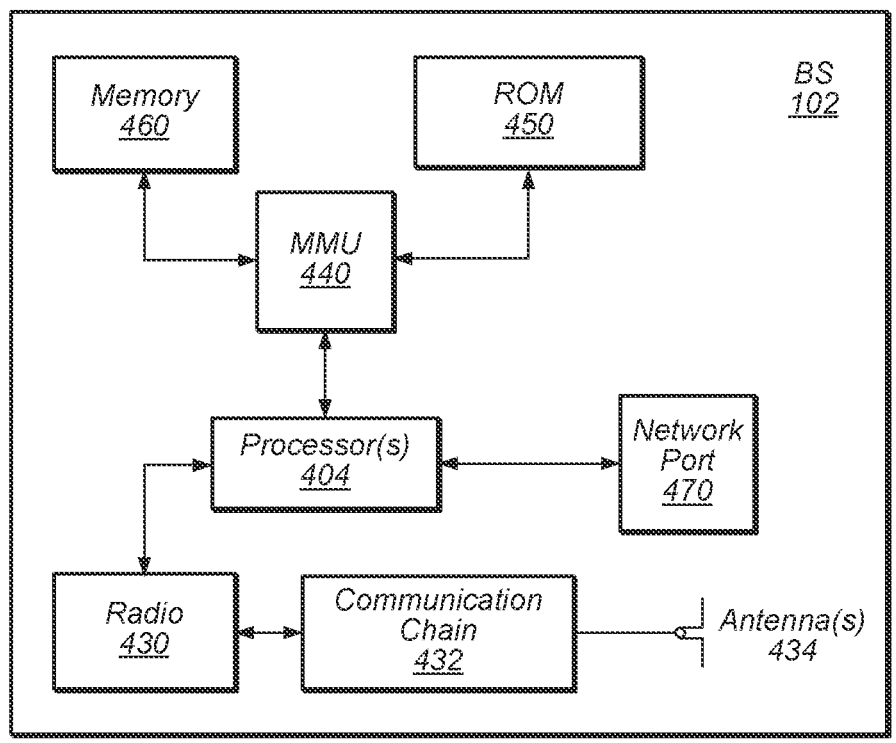
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described herein with respect to FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. The base station 102 may operate according to the various methods as disclosed herein for wireless devices to perform implicit radio resource control state transitions in a cellular communication system.

Figure 5:
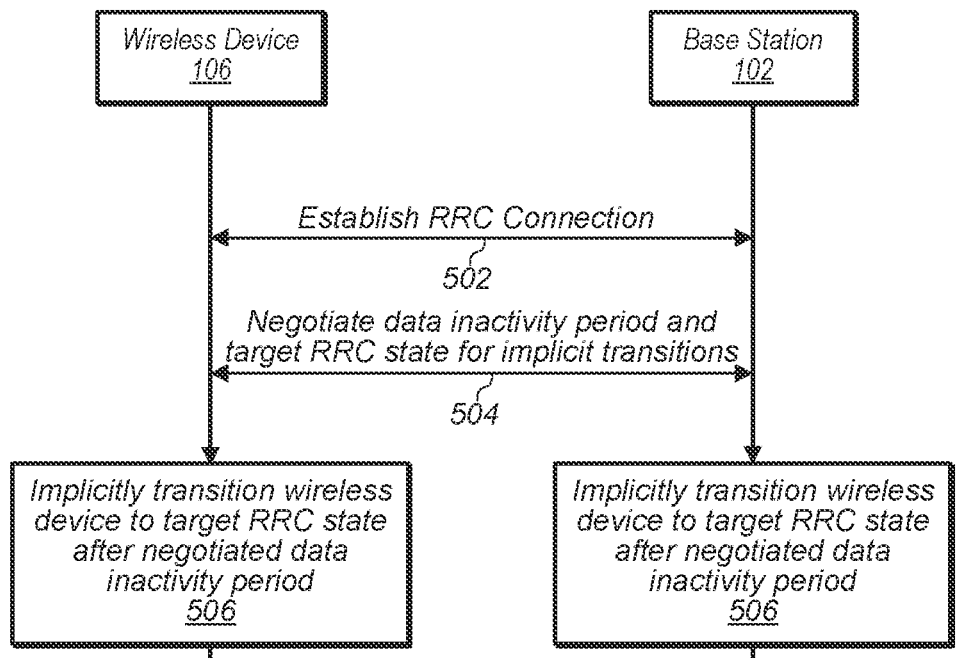
FIG. 5 is a communication flow diagram illustrating an exemplary possible method for performing implicit radio resource control state transitions in a cellular communication system, according to some embodiments.

FIG. 5—Implicit Radio Resource Control State Transitions

Multiple cellular communication technologies include the use of a radio resource control (RRC) protocol, e.g., which may facilitate connection establishment and release, radio bearer establishment, reconfiguration, and release, and/or various other possible signaling functions supporting the air interface between a wireless device and a cellular base station.

A wireless device may commonly operate in one of multiple possible conditions (e.g., states or modes) with respect to RRC. For simplicity, the condition of a wireless device with respect to RRC may be referred to subsequently herein as its RRC state. For example, in LTE, a wireless device may operate in a RRC connected state (e.g., in which the wireless device can perform continuous data transfer, and in which handover between cells is managed by the network and access stratum context information is retained for the wireless device), or in a RRC idle state (e.g., in which the wireless device may operate in a more battery efficient state when not performing continuous data transfer, in which the wireless device may handle its cell re-selection activities, and in which the network may not retain access stratum context information for the wireless device).

In addition to RRC connected and RRC idle states, it may also be possible to support one or more other types of RRC states for a wireless device, at least according to some embodiments. For example, for NR, a RRC inactive state in which a wireless device may be able to operate in a relatively battery efficient manner while the network also retains at least some access stratum context information may be supported. At least according to some embodiments, such a state may employ wireless device based mobility, e.g., such that a wireless device can move within a radio access network notification area (RNA) without notifying the next generation (NG) radio access network (RAN). While in this state, a wireless device may perform cell re-selection and system information acquisition for itself, e.g., based at least in part on system information broadcast by potential candidate cells. At the same time, the last serving base station (e.g., gNB) may keep the wireless device context and the NG connection with the 5G core network (CN) associated with the wireless device, e.g., to facilitate easier transition back to a RRC connected state. When paging a wireless device in RRC inactive state, RNA specific parameters may be used by the RAN, for example including a UE specific discontinuous reception (DRX) and UE Identity Index value (e.g., I-RNTI).

Use of a RRC inactive state may help reduce the network signaling overhead for a wireless device's connection, at least in some instances. For example, for a wireless device with infrequent data transmissions, utilizing such a RRC inactive state may reduce the amount of mobility related signaling (e.g., for handovers) needed compared to a RRC connected state, e.g., since the wireless device may be able to manage its own cell re-selection process when moving between cells. For such a wireless device, utilizing a RRC inactive state may also reduce the amount of connection setup related signaling needed compared to a RRC idle state, e.g., since the network may retain at least some context information for the wireless device. This may directly reduce the signaling latency associated with a transition to a RRC connected state.

As another potential benefit, such a state may reduce the control plane delay for a wireless device, e.g., in comparison to operating in a RRC idle state. For example, a reduced access stratum connection setup period and/or non-access stratum connection setup period may be possible for a RRC inactive state relative to a RRC idle state. The time to move from a battery efficient state to the start of continuous data transfer may thus be reduced.

Additionally, such a state may improve the power saving capability of a wireless device, e.g., in comparison to operating in a RRC connected state. For example, while in the RRC connected state, serving and/or neighboring cell measurements may be required more frequently than while in the RRC inactive state, e.g., at least in line with a connected discontinuous reception (C-DRX) period of the wireless device.

One use case that may be (or become) common in cellular communication systems may include what may be referred to as a massive machine type communication (mMTC) scenario, e.g., in which high device densities that tend to perform small periodic data communication activities are present in a cellular network. For such devices, once a data transmission is over, a device's RRC connection may be released after a pre-determined period of connection activity by way of explicit RRC connection release signaling provided by the network, at least as one possibility. However, such an explicit mechanism of releasing RRC connections may cause a heavy signaling burden on the network in the case of a mMTC scenario, at least in some instances. Further, use of a pre-determined period of connection inactivity prior to RRC connection release may represent a potential waste of power, e.g., as it may guarantee that wireless devices may spend at least a certain amount of time in RRC connected state but not performing any data activity before being released to a potentially more power efficient RRC idle or RRC inactive state. This may be particularly costly for some machine type communication (MTC) devices that may be highly power constrained (e.g., potentially with battery life expectations of 5-10 years, among other possibilities, according to various embodiments).

In view of such considerations, it may be useful to provide a mechanism for a wireless device to indicate to which RRC state it would prefer to transition after a RRC connection is released, e.g., based on its device type, current service pattern, speed, motion state, mobility history, uplink and/or downlink buffer status, and/or any of various other considerations. Further, it may be useful to provide a mechanism for a wireless device and its serving base station to implement an implicit RRC connection release, and potentially to further negotiate how long a period of data inactivity to require before each side proceeds with the implicit RRC connection release. Accordingly, FIG. 5 is a flowchart diagram illustrating a method for a wireless device (e.g., a wireless user equipment (UE) device) to perform implicit radio resource control state transitions in a cellular communication system, which may help reduce network signaling load, and/or improve wireless device power usage efficiency, among various possibilities, at least according to some embodiments.

Aspects of the method of FIG. 5 may be implemented by a wireless device, e.g., in conjunction with a cellular base station, such as a UE 106 and a BS 102 illustrated in and described with respect to various of the Figures herein, or more generally in conjunction with any of the computer systems or devices shown in the above Figures, among other devices, as desired. Note that while at least some elements of the method of FIG. 5 are described in a manner relating to the use of communication techniques and/or features associated with NR and/or 3GPP specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 502, the wireless device may establish a RRC connection with a cellular base station. Establishing the RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state.

In 504, the wireless device may negotiate a data inactivity period and a target RRC state for implicit transitions from the RRC connected state with the cellular base station. Such negotiations may be performed using any desired signaling mechanism, e.g., including using any of various (e.g., new or pre-existing) RRC messages and/or media access control (MAC) control elements (CEs). As one possibility, such negotiations may be performed during RRC connection establishment.

To negotiate the target RRC state, the wireless device may indicate a preferred target RRC state to which to transition when released from the RRC connected state. For example, the wireless device may indicate a preference for the target RRC state to be RRC idle, or to be RRC inactive. The preference may be selected by the wireless device may based on any of various considerations, e.g., including device type (e.g., MTC, phone, etc.), device mobility history, motion/speed information (e.g., high speed train, pedestrian, vehicular, etc.), service pattern (e.g., short/long data session, periodic data, etc.). Additionally, or alternatively, the wireless device may provide assistance information to the cellular base station to assist in determination of the target RRC state for the wireless device, which may include information regarding any such parameters for the wireless device among various other possible types of information.

At least in some instances, the wireless device may further indicate a preferred data inactivity timer length for the wireless device, e.g., which may be used by the wireless device and the cellular base station as a basis for determining when an implicit RRC state transition should occur. The preferred data inactivity timer length may be determined by the wireless device based on similar considerations as used to determine the preferred target RRC state to which to transition when released from the RRC connected state for the wireless device, and/or may include any of various other possible parameters. Additionally or alternatively, the wireless device may provide such assistance information to the cellular base station to additionally/alternatively assist in determination of the data inactivity timer length for the wireless device.

The cellular base station (or possibly more generally the network in which the cellular base station operates) may determine a target RRC state for the wireless device to transition to when released from the RRC connected state and/or a data inactivity timer length for the wireless device to be used for implicit RRC state transitions, e.g., based at least in part on the information provided by the wireless device. In other words, the cellular base station may take into consideration any or all of a preferred target RRC state indicated by the wireless device, a preferred data inactivity timer length indicated by the wireless device, and/or any of various types of assistance information (e.g., a device type of the wireless device; mobility history information for the wireless device; motion information for the wireless device; or a service pattern of the wireless device, among other possible types of assistance information) provided by the wireless device. The cellular base station may determine the target RRC state and/or the data inactivity timer length for the wireless device additionally or alternatively based at least in part on any of various additional or alternative types and/or sources of information. For example, the cellular base station may base its determination on downlink buffer status information available for the wireless device, network load and/or other network resource availability, and/or any of various other considerations.

The cellular base station may indicate the determined target RRC state and/or data inactivity timer length to the wireless device. Note that the target RRC state determined by the cellular base station may be the same as the preferred target RRC state indicated by the wireless device, or may be a different RRC state, according to various embodiments. Similarly, the data inactivity timer length determined by the cellular base station may be the same as the requested data inactivity timer length, or may be a different data inactivity timer length. At least according to some embodiments, the wireless device may accept the target RRC state and/or data inactivity timer length indicated by the cellular base station regardless of whether they match the target RRC state and/or data inactivity timer length requested by the wireless device. For example, as one possibility, cellular communication standard documents may specify (or a cellular network operator and a wireless device vendor may otherwise agree) that a wireless device shall always accept the target RRC state and data inactivity timer length parameters provided by the cellular network. Other arrangements are also possible.

The cellular base station and the wireless device may each initiate a data inactivity timer having the negotiated data inactivity timer length. The data inactivity timers may be used by the cellular base station and the wireless device to separately track whether and when to implicitly release the RRC connection. On each occasion of data activity (e.g., uplink activity, downlink activity) between the wireless device and the cellular base station, each of the cellular base station and the wireless device may restart their data inactivity timers for the wireless device. Note that data activity occurrences may be determined based on either or both of physical layer (layer 1, e.g., hybrid automatic repeat request (HARQ)) activity or radio link control (RLC)/media access control (MAC) (layer 2/3) activity, among various possibilities, as desired.

Note that if the wireless device undergoes mobility (e.g., handover to another cell that may be provided by a different cellular base station occurs) during the RRC connection, target RRC state and data inactivity timer length information for the RRC connection may be maintained (e.g., as context information for the wireless device) such that the new serving base station may be aware of the determined target RRC state and data inactivity timer length, and may track the current data inactivity timer value for the wireless device.

Note also that, if desired, the wireless device and/or the cellular base station may avoid scheduling any uplink or downlink activity for a certain amount of time leading up to expiration of the data inactivity timer used to determine when an implicit RRC state transition occurs. The duration of such a restriction may be selected as desired, e.g., to reduce the likelihood of possible synchronization issues that could occur from such data activity if the data inactivity timer at the wireless device and the data inactivity timer at the cellular base station are slightly offset.

In 506, when the data inactivity timer expires, the wireless device and the cellular base station may implicitly release the wireless device from the RRC connected state to the target RRC state. Thus, if the target RRC state is RRC idle, the wireless device may begin operating according to an idle timeline (e.g., following an idle discontinuous reception (DRX) paging timeline configured between the wireless device and the network), while if the target RRC state is RRC inactive, the wireless device may begin operating according to an inactive timeline (e.g., following an inactive DRX paging timeline configured between the wireless device and the network). The cellular base station may similarly follow the paging timeline appropriate to the RRC state of the wireless device, as well as manage context information for the wireless device in accordance with the target RRC state. At least according to some embodiments, such an implicit RRC state transition of the wireless device to the target RRC state may be accomplished without any explicit over the air signaling between the wireless device and the cellular base station, e.g., at least at the time of the RRC state transition.

Note that if desired, a mechanism may also be provided for a wireless device to indicate a preference for the inactive DRX cycle length that will be used for the wireless device when it operates in the RRC inactive state. For example, as one possibility, the wireless device may indicate its preferred inactive DRX value (e.g., separately and in addition to its preferred idle DRX value, or implicitly by indicating its preferred idle DRX value) in an attach request or RNA update request message. The network and the wireless device may determine the DRX cycle length for use by the wireless device in the RRC inactive state based at least in part on the indication of the preferred DRX cycle length, e.g., and also potentially based at least in part on a network preferred inactive DRX cycle length. For example, the smaller value (e.g., resulting in a shorter DRX cycle) among the wireless device preferred inactive DRX cycle length and the network preferred inactive DRX cycle length may be selected as the inactive DRX cycle length for the wireless device, as one possibility. Other approaches to selecting the DRX cycle length for the wireless device in the RRC inactive state are also possible.

Note further that while negotiation of a data inactivity timer length and use of such a data inactivity timer to support implicit RRC state transitions in conjunction with negotiation of a target RRC state to which to transition after a RRC connection is released may be beneficial in at least some instances, negotiation of a target RRC state to which to transition after a RRC connection is released could also be used in conjunction with explicit RRC connection release signaling techniques. For example, at least in some instances, it may be possible for the wireless device to be released from the RRC connected state to the target RRC state based at least in part on an explicit RRC connection release indication received from the cellular base station.

By utilizing such techniques for negotiating a target RRC state and/or supporting implicit RRC state transitions, a wireless device may be able to transition more quickly to a power efficient operating state, such as an inactive or idle state, after a data communication session. For example, it may be possible to negotiate for a lower data inactivity timer length for an implicit RRC state transition than might occur before an explicit RRC connection release message might be provided. Additionally, such techniques may substantially reduce the amount of over the air downlink network signaling used for providing RRC connection release. Thus, at least according to some embodiments, the techniques described herein may reduce the signaling load on the network, improve power efficiency, and/or reduce data transmission delays for the wireless device, among other possible benefits.

Note that as one possibility, the techniques described herein for negotiating data inactivity timer length and/or target RRC state could be utilized on a per RRC connection basis. For example, the wireless device may indicate its preferred target RRC state and/or data inactivity timer length, and receive indications of the target RRC state and/or data inactivity timer length selected for the wireless device by the network, each time the wireless device establishes a RRC connection. This may allow for a wireless device with potentially changing preferences (e.g., due to experiencing different service patterns at different times) to more flexibly accommodate such changing preferences. Alternatively or in addition, it may be possible for a wireless device to establish data inactivity timer length and/or target RRC state parameters for the wireless device than can persist through multiple RRC connections. For example, in such a case, the wireless device and the network may store such information as part of context information for the wireless device between RRC connections. This may allow for a wireless device with predictable preferences to avoid potentially unnecessary signaling to repeatedly negotiate the same parameters each time an RRC connection is established, at least according to some embodiments.

FIGS. 6-11—Message Sequence Charts and Additional Information

FIGS. 6-11 illustrate further aspects that might be used in conjunction with the method of FIG. 5 if desired. It should be noted, however, that the exemplary details illustrated in and described with respect to FIGS. 6-11 are not intended to be limiting to the disclosure as a whole: numerous variations and alternatives to the details provided herein below are possible and should be considered within the scope of the disclosure.

5G NR may be expected to handle use cases including mMTC scenarios. MTC devices (e.g., UEs) may typically enter RRC connected state with their serving network periodically (e.g., potentially infrequently) for a short amount of time, e.g., to exchange a small amount of data. Once the data transmission/reception is over, the network may release the RRC connection for the UE after a predetermined period of connection inactivity, which may be on the order of seconds, among various possibilities.

If very high device densities occur (e.g., on the order of millions of devices per a particular geographic area, as one possibility; other definitions are also possible), this may imply a very heavy signaling load on the air interface just to release the RRC connections of the devices served by the network if an explicit over the air RRC signaling message is used.

Further, such a mechanism may force devices that may be highly power constrained (e.g., with battery requirements running to 5-10 years, as one possibility; other definitions are also possible) to waste unnecessary time in RRC connected state, even after their intended data transaction is complete with the network. Such devices may instead be better served by being able to transition to a more power efficient state (e.g., an idle or inactive state) more quickly. Accordingly, a fallback scheme that may better meet the needs of the devices served in a cellular network is described herein.

The techniques described herein may be useful, among various other possible use cases, for a cellular device that is a wearable or otherwise battery limited device that, at least on some occasions, may need to transfer a very small amount of data with its serving network. In such an instance, such a device may be able to signal its intent to the network and attempt to complete the data transaction such as to be able to quickly fallback to a power efficient state such as RRC inactive or RRC idle. Note that such a scheme may also or alternatively be useful in any number of other possible use cases, according to various embodiments.

As part of such a scheme, a cellular device may indicate a preferred target state (e.g., RRC inactive or RRC idle), based on its traffic pattern and/or other assistance parameters. The network may choose to honor the device's recommendation, or select an alternative target state, and may use the network's selected RRC connection release mechanism to transition the device to the requested target state.

The additional assistance parameters from the device may include any of various possible parameters. For example, device type (e.g., MTC, phone), device mobility history, device motion and speed (high speed train, pedestrian, vehicular, etc.), service pattern (short/long data session, periodic data, etc.), and/or any of various other parameters/characteristics of the cellular device may be provided. Such assistance information can indicate the UE's intent to (e.g., quickly) fallback to a power efficient state rather than remaining in a connected state, at least in some instances.

Fallback to a particular target state may be accomplished using explicit RRC connection release mechanism, or using an implicit RRC connection release mechanism, among various possibilities. For an implicit mechanism, the cellular device and network may be able to negotiate a threshold timer value, e.g., based on the assistance information provided by the device and/or an indication by the device of a requested/preferred threshold timer value. The threshold timer value may control when the device can automatically transition out of RRC connected to the target state without explicit RRC signaling from the network.

Thus, as one possibility, a scheme utilizing both negotiation of a target state for a cellular device to transition to after RRC connection release and an implicit RRC connection release mechanism may operate as follows. When the device is in a RRC inactive or idle state, it may request (e.g., in any agreed upon RRC signaling message) a preferred data inactivity timer and a preferred RRC state to fall back to when the inactivity timer expires from the network. In addition the device can also indicate a service pattern and/or any relevant assistance information that can help the network to configure an inactivity timer and preferred RRC state after expiry of the inactivity timer.

The network may respond (e.g., in any agreed upon RRC signaling message) with the data inactivity timer value that the device should apply and the RRC state that the device should transition to (e.g., from RRC connected) when the data inactivity timer expires. Note that the parameters from the network may be binding on the device, e.g., both for the data inactivity timer value and the target RRC state, regardless of the values requested by the device in uplink, at least according to some embodiments. For example, as previously noted, in some instances a cellular communication standard or other agreement among relevant parties may specify that such network provided parameters must be accepted by a wireless device, e.g., in order to be compliant with that standard or agreement.

In order to ensure inter-operability with other devices that do not wish to implement such a feature, it may be possible to use encoding for the preferred data inactivity timer and the preferred state after data inactivity timer expiry as optional (e.g., non-critical ASN.1 extensions) in the uplink RRC message, and/or to use encoding for the data inactivity timer and the state after data inactivity timer expiry as optional (e.g., non-critical ASN.1 extensions) in the downlink RRC message. Thus, for example, if the newly introduced information elements supporting such a feature are not present in the downlink RRC signaling message, it may be assumed (e.g., by a wireless device that has provided an indication of a preferred data inactivity timer and/or a preferred state to which to transition after data inactivity timer expiry) that the network does not support this feature.

As an additional or alternative feature, it may also be possible to provide a mechanism for a cellular device to negotiate the DRX duration/cycle length for the RRC inactive state. For example, according to some embodiments, the device may request a preferred DRX periodicity for use while in the RRC inactive state from the network. Such a request may be provided in an uplink non-access stratum (NAS) message, e.g., such that the device may optionally encode the requested DRX periodicity for the RRC inactive state. The network may encode a preferred DRX periodicity for the RRC inactive state in a downlink system information message. At least according to some embodiments, the configured inactive DRX periodicity may be selected as the minimum of what is requested in the NAS signaling by the device and what is broadcasted by the network in the cell system information.

FIGS. 6-11 are message sequence charts illustrating various possible scenarios that may occur between a UE and a network when such schemes are implemented. Note that while the time units represented in FIGS. 6-11 are represented as being seconds for the sake of convenience, it should be noted that other units (e.g., as a function of 5G NR subframe/slot/minislot duration and/or with an offset implied, among various possibilities) can also be used, and this representation should not be considered limiting. Similarly, while the parameter negotiation is shown in the illustrated Figures as being performed using RRCConnectionResumeRequest/Confirm messages, such negotiation can be part of any desired RRC signaling message, e.g., including the initial RRCConnectionSetup procedure. Further, the assistance information for negotiation need not be limited to a preferred data inactivity timer length and target RRC state, but can also or alternatively include service pattern and/or any other desired assistance information, such as device mobility history, device motion, device type, etc. In other words, while the details of the illustrated scenarios of FIGS. 6-11 may be representative of some possible implementation choices, numerous other details may also or alternatively be used as desired, and the scenarios of FIGS. 6-11 should not be considered limiting to the disclosure as a whole.

Figure 6:
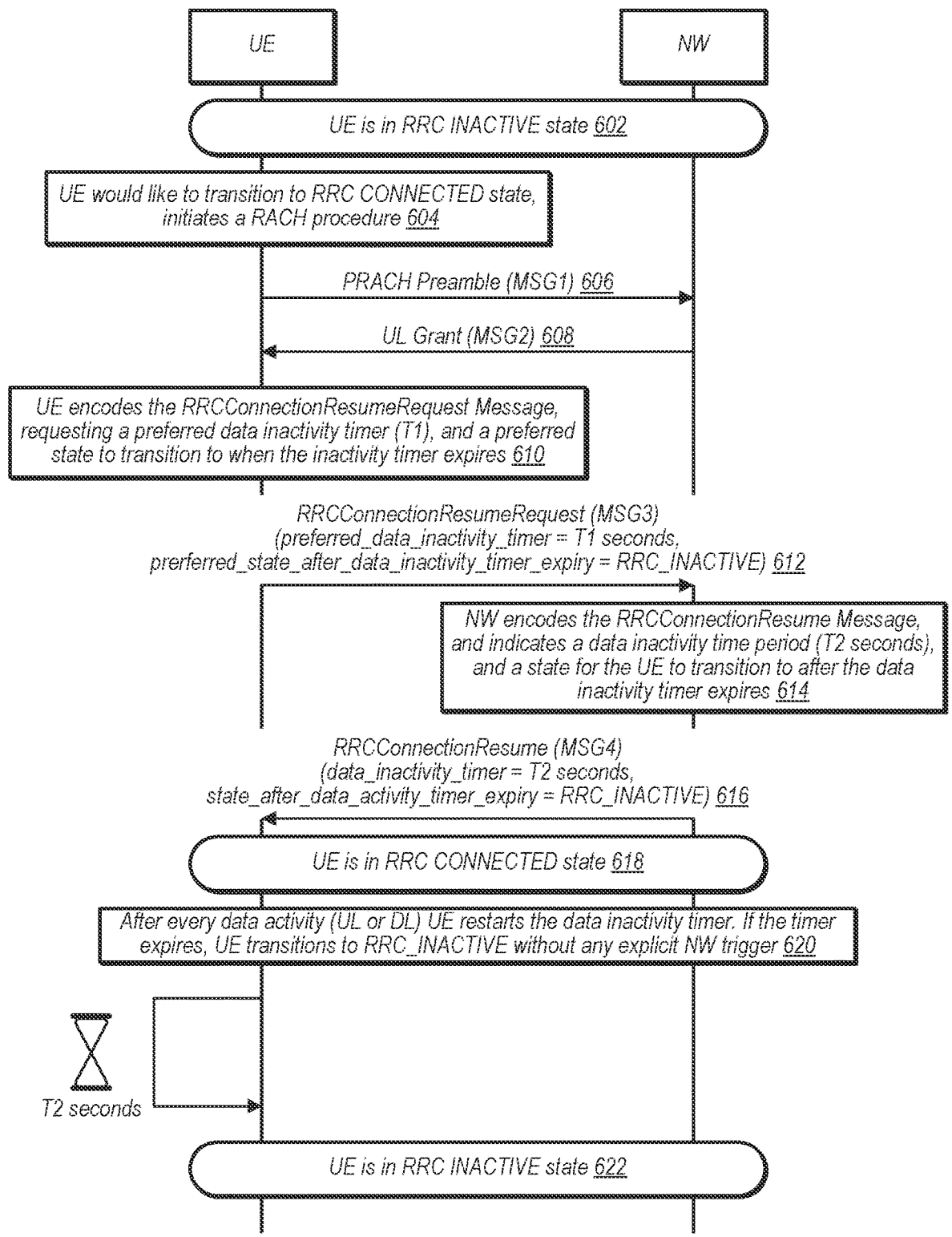
FIGS. 6-10 are message sequence charts illustrating various exemplary possible communication flows for performing implicit radio resource control state transitions in a cellular communication system, according to some embodiments.

FIG. 6 illustrates a scenario in which a UE requests RRC inactive as its preferred state after data inactivity timer expiry, and in which RRC inactive is also selected by the network as the state to which to transition after data inactivity timer expiry, according to some embodiments.

As shown, in 602, initially the UE may operate in the RRC inactive state. In 604, the UE may determine to transition to the RRC connected state, and in 606, the UE may initiate a random access channel (RACH) procedure, by transmitting a physical RACH (PRACH) preamble on the uplink, which may also be referred to as a MSG1. In 608, the network may respond on the downlink with an uplink grant, which may also be referred to as a MSG2. The UE may encode (610) and transmit (612) on the uplink a RRCConnectionResumeRequest message (which may also be referred to as a MSG3), requesting a preferred data inactivity timer value (T1), and a preferred state to transition to when the inactivity timer expires (RRC_INACTIVE). The network may encode (614) and transmit (616) a RRCConnectionResume message on the downlink (which may also be referred to as a MSG4), indicating a data inactivity period (T2) and a state for the UE to transition to after the data inactivity timer expires (RRC_INACTIVE). Note that, in the example scenario of FIG. 6, the data inactivity timer prescribed by the network (e.g., T2, in the illustrated scenario) and state (e.g., RRC_INACTIVE, in the illustrated scenario) may be binding on the UE.

Upon completing the RRC connection establishment procedure, the UE may be in the RRC connected state (618), and may initiate the data inactivity timer in accordance with the negotiated data inactivity timer length. In 620, the UE may restart the data inactivity timer after every data activity (UL or DL) between the UE and the network. If the timer expires, the UE may transition to the RRC inactive state without any explicit network trigger, and may subsequently operate in the RRC inactive state (622).

Figure 7:
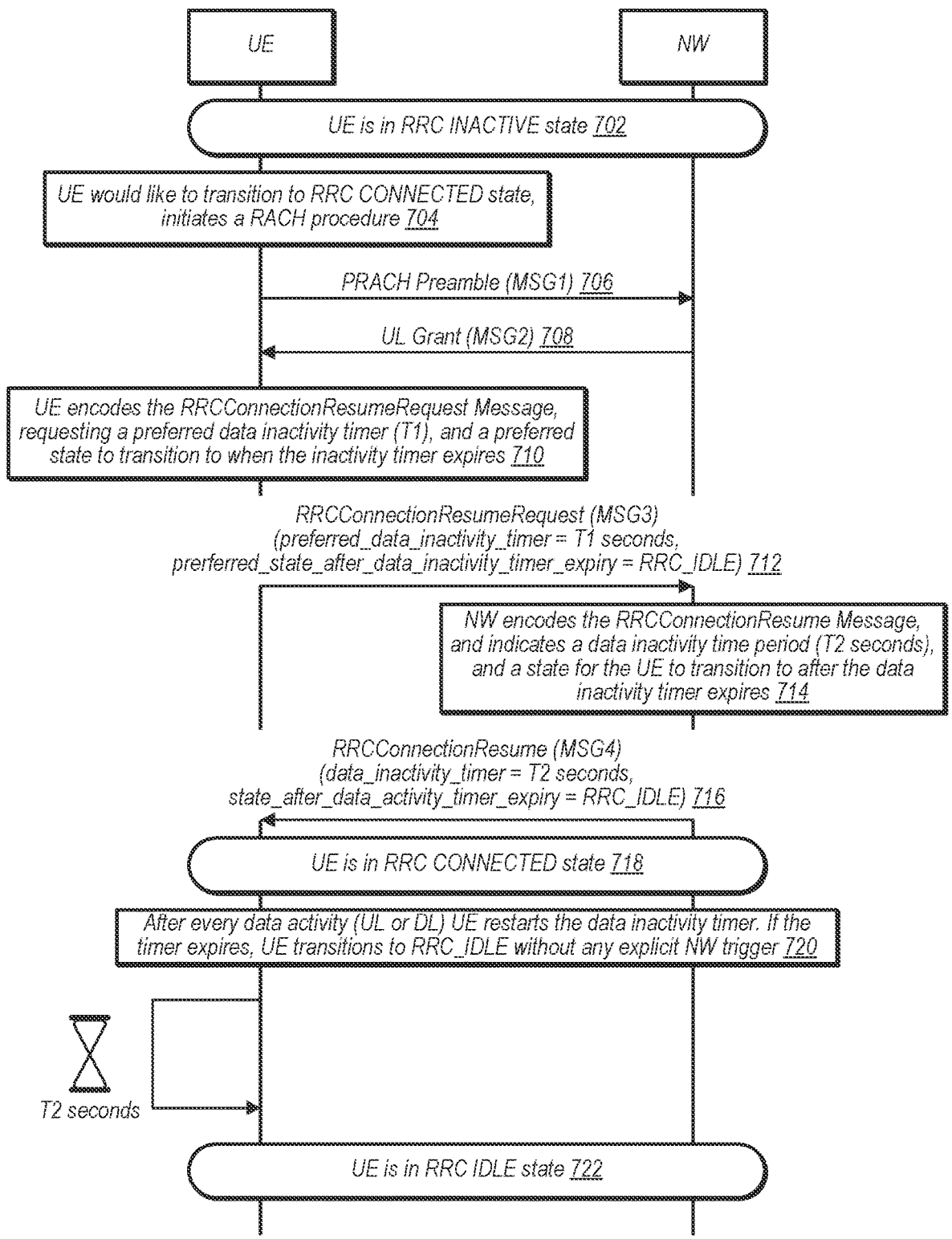

FIG. 7 illustrates a scenario in which a UE requests RRC idle as its preferred state after data inactivity timer expiry, and in which RRC idle is also selected by the network as the state to which to transition after data inactivity timer expiry, according to some embodiments.

As shown, in 702, initially the UE may operate in the RRC inactive state. In 704, the UE may determine to transition to the RRC connected state, and in 706, may initiate a RACH procedure, by transmitting a PRACH preamble. In 708, the network may respond with an uplink grant. The UE may encode (710) and transmit (712) a RRCConnectionResumeRequest message, requesting a preferred data inactivity timer value (T1), and a preferred state to transition to when the inactivity timer expires (RRC_IDLE). The network may encode (714) and transmit (716) a RRCConnectionResume message, indicating a data inactivity period (T2) and a state for the UE to transition to after the data inactivity timer expires (RRC_IDLE). As in the scenario of FIG. 6, in the example scenario of FIG. 7, the data inactivity timer prescribed by the network (e.g., T2, in the illustrated scenario) and state (e.g., RRC_IDLE, in the illustrated scenario) may be binding on the UE.

Upon completing the RRC connection establishment procedure, the UE may be in the RRC connected state (718), and may initiate the data inactivity timer in accordance with the negotiated data inactivity timer length. In 720, the UE may restart the data inactivity timer after every data activity (UL or DL) between the UE and the network. If the timer expires, the UE may transition to the RRC idle state without any explicit network trigger, and may subsequently operate in the RRC idle state (722).

Figure 8:
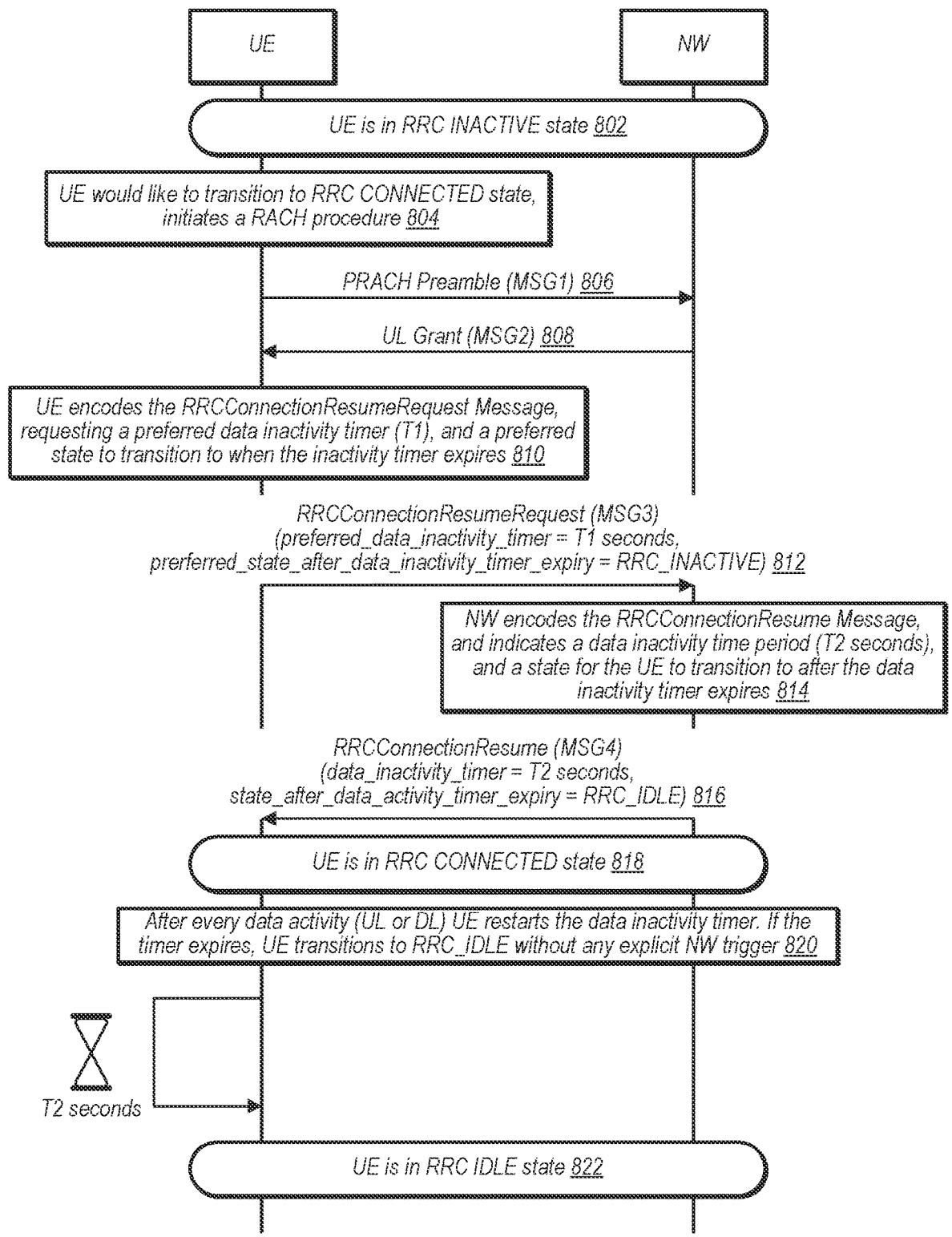

FIG. 8 illustrates a scenario in which a UE requests RRC inactive as its preferred state after data inactivity timer expiry, but in which RRC idle is instead selected by the network as the state to which to transition after data inactivity timer expiry, according to some embodiments.

As shown, in 802, initially the UE may operate in the RRC inactive state. In 804, the UE may determine to transition to the RRC connected state, and in 806, may initiate a RACH procedure, by transmitting a PRACH preamble. In 808, the network may respond with an uplink grant. The UE may encode (810) and transmit (812) a RRCConnectionResumeRequest message, requesting a preferred data inactivity timer value (T1), and a preferred state to transition to when the inactivity timer expires (RRC_INACTIVE). The network may encode (814) and transmit (816) a RRCConnectionResume message, indicating a data inactivity period (T2) and a state for the UE to transition to after the data inactivity timer expires (RRC_IDLE). Again, in the example scenario of FIG. 8, the data inactivity timer prescribed by the network (e.g., T2, in the illustrated scenario) and state (e.g., RRC_IDLE, in the illustrated scenario) may be binding on the UE.

Upon completing the RRC connection establishment procedure, the UE may be in the RRC connected state (818), and may initiate the data inactivity timer in accordance with the negotiated data inactivity timer length. In 820, the UE may restart the data inactivity timer after every data activity (UL or DL) between the UE and the network. If the timer expires, the UE may transition to the RRC idle state without any explicit network trigger, and may subsequently operate in the RRC idle state (822).

Figure 9:
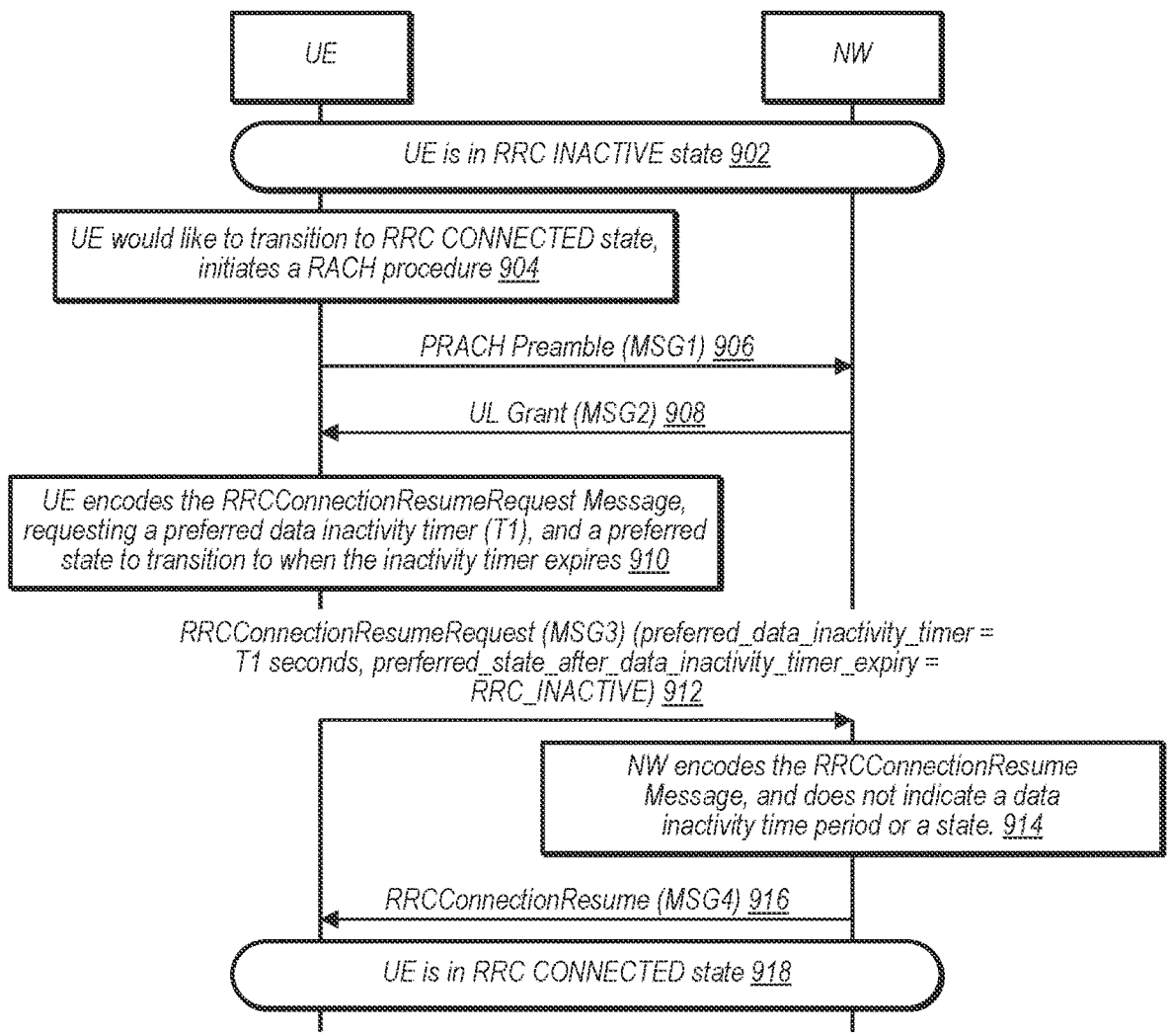

FIG. 9 illustrates a scenario in which a UE requests RRC inactive as its preferred state after data inactivity timer expiry, but in which the network does not indicate a data inactivity time period or a state to which to transition after data inactivity timer expiry, according to some embodiments.

As shown, in 902, initially the UE may operate in the RRC inactive state. In 904, the UE may determine to transition to the RRC connected state, and in 906, may initiate a RACH procedure, by transmitting a PRACH preamble. In 908, the network may respond with an uplink grant. The UE may encode (910) and transmit (912) a RRCConnectionResumeRequest message, requesting a preferred data inactivity timer value (T1), and a preferred state to transition to when the inactivity timer expires (RRC_INACTIVE). The network may encode (914) and transmit (916) a RRCConnectionResume message, which may not indicate a data inactivity time period or a state to which to transition after data inactivity timer expiry. Such a scenario may occur, for example, if the network chooses not to support such a feature. In such a scenario, the UE may still be able to complete the RRC connection establishment procedure, and to subsequently operate in the RRC connected state (918), but may not have a configured data inactivity timer for implicit RRC state transitions or a target RRC state to which to transition. Thus, at least according to some embodiments, the UE and the network may use an explicit RRC connection release mechanism to eventually release the RRC connection in the scenario illustrated in FIG. 9.

Figure 10:
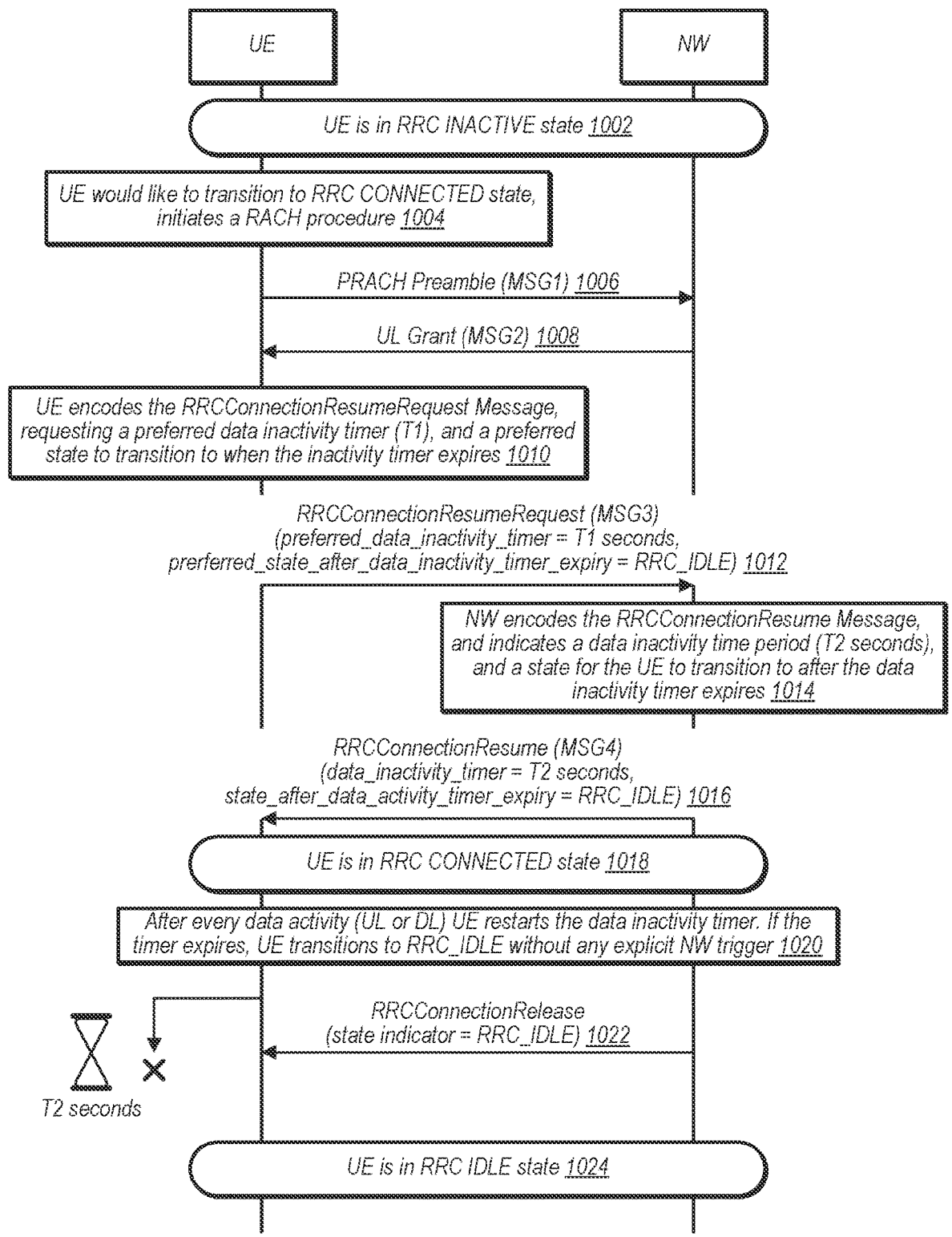

FIG. 10 illustrates a scenario in which a UE requests RRC idle as its preferred state after data inactivity timer expiry, and in which RRC idle is also selected by the network as the state to which to transition after data inactivity timer expiry, according to some embodiments. However, in the scenario of FIG. 10, the network may override use of the negotiated data inactivity timer by providing an explicit RRC connection release message.

As shown, in 1002, initially the UE may operate in the RRC inactive state. In 1004, the UE may determine to transition to the RRC connected state, and in 1006, may initiate a RACH procedure, by transmitting a PRACH preamble. In 1008, the network may respond with an uplink grant. The UE may encode (1010) and transmit (1012) a RRCConnectionResumeRequest message, requesting a preferred data inactivity timer value (T1), and a preferred state to transition to when the inactivity timer expires (RRC_IDLE). The network may encode (1014) and transmit (1016) a RRCConnectionResume message, indicating a data inactivity period (T2) and a state for the UE to transition to after the data inactivity timer expires (RRC_IDLE).

Upon completing the RRC connection establishment procedure, the UE may be in the RRC connected state (1018), and may initiate the data inactivity timer in accordance with the negotiated data inactivity timer length. In 1020, the UE may restart the data inactivity timer after every data activity (UL or DL) between the UE and the network. If the timer expires, the UE would transition to the RRC idle state without any explicit network trigger, and subsequently operate in the RRC idle state. However, in the illustrated scenario, in 1022, the network may provide a RRCConnectionRelease message indicating to the UE to release the RRC connection and to transition to a specified RRC state (e.g., RRC_IDLE, in the illustrated scenario) prior to expiration of the data inactivity timer, which may also trigger the UE to transition to the RRC idle state (1024).

Thus, even if an implicit RRC connection release mechanism is configured, it may still be possible for the network to explicitly release the RRC connection (e.g., potentially earlier than would occur according to the implicit RRC connection release mechanism). Note that in such a case, the RRC connection release could configure the UE to transition to the previously agreed upon RRC state (e.g., RRC_IDLE, in the illustrated scenario) or a different RRC state, as desired.

At least according to some embodiments, use of the techniques described herein for supporting implicit RRC state transitions and for negotiating a target RRC state to transition to after RRC connection release may lower data transfer latency, e.g., by potentially making use of the RRC inactive state. For example, since the access stratum context establishment (e.g., including AS security and measurement configuration) may be avoided during the follow-up transition to the RRC connected state, the time required to begin data transfer may be reduced (e.g., potentially by 100-200 ms, as one possibility; other amounts of time for AS context establishment are also possible). Additionally, such techniques may reduce the amount of downlink signaling used in a cellular communication system, e.g., as at least some RRC connection release signaling may not be needed. Further, such techniques may allow for faster transitions from RRC connected to more power efficient states such as RRC inactive or RRC idle, e.g., as there may be no need to wait for an explicit network guard timer expiry to trigger the state transition out of RRC connected, which may be beneficial to power constrained devices for which power efficiency may be particularly important.

Figure 11:
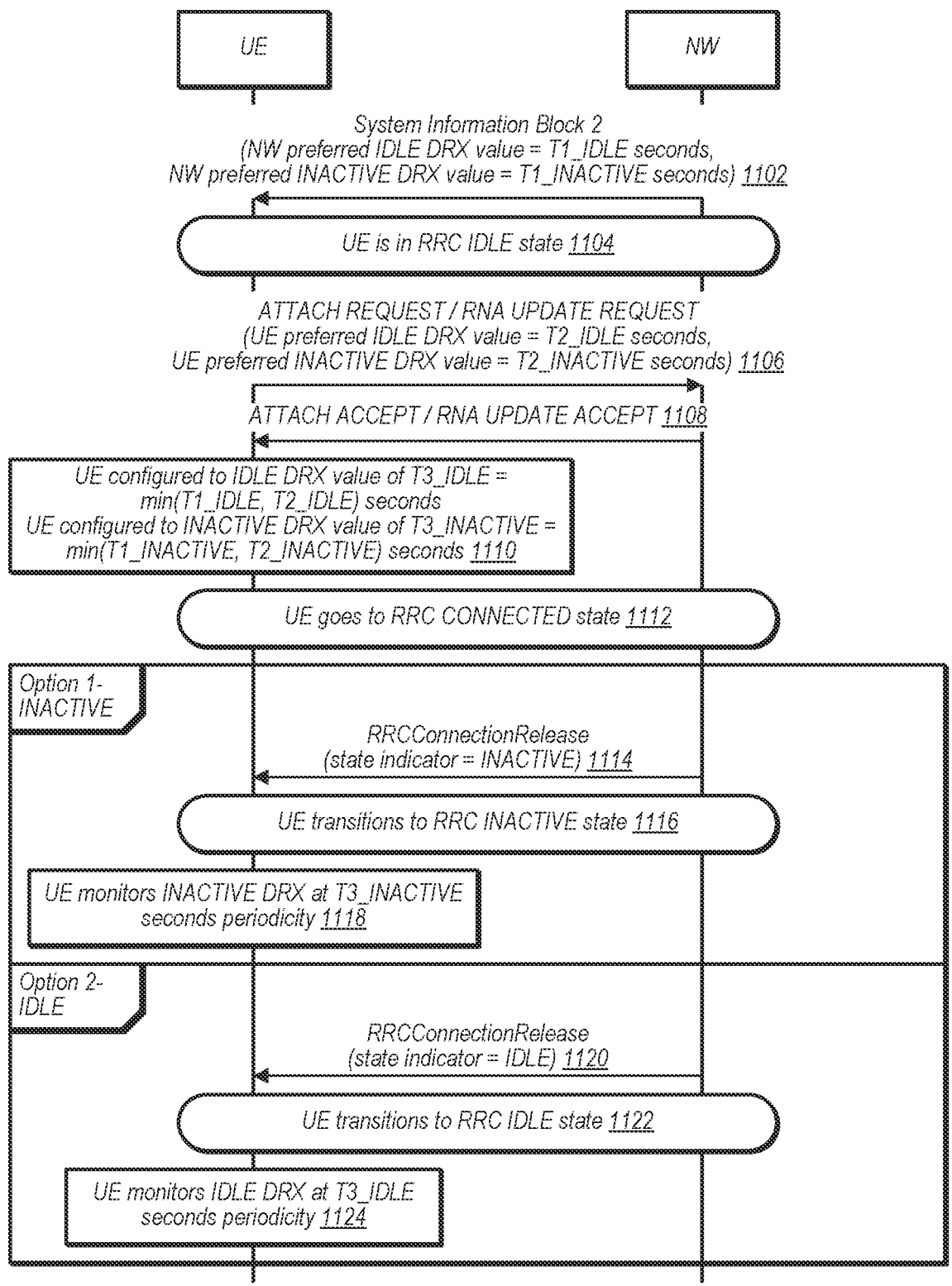
FIG. 11 is a message sequence chart illustrating an exemplary possible communication flow for negotiating preferred discontinuous reception cycle lengths in a cellular communication system, according to some embodiments.

FIG. 11 illustrates a scenario in which the UE can indicate a preferred RRC inactive DRX cycle length, according to some embodiments.

As shown, in 1102, the UE may receive system information (e.g., system information block 2) from the network that may indicate the network's preferred idle DRX value (e.g., T1_IDLE, in the illustrated scenario), as well as the network's preferred inactive DRX value (e.g., T1_INACTIVE, in the illustrated scenario). While in the RRC idle state (1104), the UE may transmit an attach request or a RNA update request to the network (1106). The attach/RNA update request may indicate the UE's preferred idle DRX value (e.g., T2_IDLE, in the illustrated scenario), as well as the UE's preferred inactive DRX value (e.g., T2_INACTIVE, in the illustrated scenario). In 1108, the network may respond with an attach accept or RNA update accept message, e.g., as appropriate. Based on the network preferred and UE preferred values, in 1110, the UE may be able to determine and configure its idle and inactive DRX values. For example, in the illustrated scenario, the idle DRX value may be configured as T3_IDLE=min(T1_IDLE, T2_IDLE), while the inactive DRX value may be configured as T3_INACTIVE=min(T1_INACTIVE, T2_INACTIVE). In 1112, the UE may transition to the RRC connected state.

When the UE is released from the RRC connected state, the UE may implement the configured inactive DRX or idle DRX cycle length, e.g., depending on whether the UE is released to RRC inactive or RRC idle. For example, as shown, as a first option, in 1114, the network may transmit a RRCConnectionRelease message with a state indicator equal to inactive, in which case the UE may transition to the RRC inactive state (1116), and perform inactive DRX monitoring with a periodicity of T3_INACTIVE (1118). As a second option, in 1120, the network may transmit a RRCConnectionRelease message with a state indicator equal to idle, in which case the UE may transition to the RRC idle state (1122), and perform idle DRX monitoring with a periodicity of T3_IDLE (1124). Note that, while not shown in FIG. 11, the UE could alternatively be released from the RRC connection implicitly, e.g., such as according to various of the techniques described herein.

At least according to some embodiments, use of the techniques described herein for negotiating inactive DRX cycle length may improve the ability of a network to distinguish between devices in RRC inactive and RRC idle with different paging periodicity and to allocate a DRX duration commensurate with device capability/type, which may help the network obtain a more even page load distribution. Additionally, delay sensitive devices may particularly benefit from a shorter DRX cycle in RRC inactive compared to RRC idle, e.g., as it may allow for faster transitions to RRC connected as and when required.

In the following further exemplary embodiments are provided.

One set of embodiments may include an apparatus, comprising a processing element configured to cause a wireless device to: establish a radio resource control (RRC) connection with a cellular base station; determine a data inactivity timer length and a target RRC state for implicit RRC transitions; initiate a data inactivity timer having the determined data inactivity timer length; determine that the data inactivity timer has expired; and transition to the target RRC state based at least in part on determining that the data inactivity timer has expired.

According to some embodiments, to determine the data inactivity timer length and the target RRC state for implicit RRC transitions, the processing element is further configured to cause the wireless device to: provide an indication of a requested data inactivity timer length and an indication of a preferred target RRC state to the cellular base station; and receive an indication of the data inactivity timer length and the target RRC state from the cellular base station.

According to some embodiments, the processing element is further configured to cause the wireless device to provide an indication of one or more parameters configured to assist in determination of one or more of the data inactivity timer length or the target RRC state, wherein the one or more parameters comprise one or more of: a device type of the wireless device; mobility history information for the wireless device; motion information for the wireless device; or a service pattern of the wireless device.

According to some embodiments, the data inactivity timer length is different from the requested data inactivity timer length.

According to some embodiments, the target RRC state is different from the preferred target RRC state.

According to some embodiments, the processing element is further configured to cause the wireless device to: provide an indication of a preferred discontinuous reception (DRX) cycle length for use by the wireless device in a RRC inactive state; and receive an indication of a DRX cycle length for use by the wireless device in the RRC inactive state from the cellular base station.

According to some embodiments, the processing element is further configured to cause the wireless device to: reset the data inactivity timer after each data activity between the wireless device and the cellular base station.

According to some embodiments, the transition to the target RRC state based at least in part on determining that the data inactivity timer has expired comprises an implicit RRC state transition that is performed without explicit signaling between the wireless device and the cellular base station.

Another set of embodiments may include a wireless device, comprising: at least one antenna; a radio operably coupled to the at least one antenna; and a processing element operably coupled to the radio; wherein the wireless device is configured to: transition to a radio resource control (RRC) connected state with a cellular base station; transmit, to the cellular base station, an indication of a preferred target RRC state to which to transition when released from the RRC connected state; receive, from the cellular base station, an indication of a target RRC state to which to transition when released from the RRC connected state; and transition to the target RRC state when released from the RRC connected state.

According to some embodiments, the wireless device is implicitly released from the RRC connected state based at least in part on a determination by the wireless device to transition from the RRC connected state without receiving an explicit indication from the cellular base station.

According to some embodiments, the wireless device is further configured to: transmit, to the cellular base station, an indication of a preferred data inactivity timer length for the wireless device; and receive, from the cellular base station, an indication of a data inactivity timer length for the wireless device, wherein the determination by the wireless device to transition from the RRC connected state without receiving an explicit indication from the cellular base station is based at least in part on expiration of a data inactivity timer having the data inactivity timer length indicated by the cellular base station.

According to some embodiments, the target RRC state is selected based at least in part on the indication of the preferred target RRC state.

According to some embodiments, the wireless device is released from the RRC connected state based at least in part on an explicit RRC connection release indication received from the cellular base station.

According to some embodiments, the target RRC state comprises one of: RRC idle; or RRC inactive.

A further set of embodiments may include a cellular base station, comprising: at least one antenna; a radio operably coupled to the at least one antenna; and a processing element operably coupled to the radio; wherein the cellular base station is configured to: establish a radio resource control (RRC) connection with a wireless device; receive, from the wireless device, an indication of a preferred RRC state to which to transition after the RRC connection is released; determine a RRC state for the wireless device to transition to after the RRC connection is released based at least in part on the indication of the preferred RRC state to which to transition after the RRC connection is released; and transmit, to the wireless device, an indication of the determined RRC state for the wireless device to transition to after the RRC connection is released.

According to some embodiments, the cellular base station is further configured to: receive, from the wireless device, an indication of one or more parameters, wherein the one or more parameters comprise one or more of: a device type of the wireless device; mobility history information for the wireless device; motion information for the wireless device; or a service pattern of the wireless device, wherein the RRC state for the wireless device to transition to after the RRC connection is released is determined further based at least in part on the one or more parameters.

According to some embodiments, the cellular base station is further configured to: receive, from the wireless device, an indication of a preferred data inactivity timer length for the wireless device; determine a data inactivity timer length for the wireless device based at least in part on the indication of the preferred data inactivity timer length for the wireless device; and transmit, to the wireless device, an indication of the determined data inactivity timer length for the wireless device.

According to some embodiments, the cellular base station is further configured to: initiate a data inactivity timer for the wireless device for the RRC connection, wherein the data inactivity timer has the determined data inactivity timer length; restart the data inactivity timer after each data activity with the wireless device during the RRC connection; and implicitly release the RRC connection with the wireless device upon expiration of the data inactivity timer.

According to some embodiments, the cellular base station is further configured to: determine not to schedule data activity with the wireless device at a first time based at least in part on a current value of the data inactivity timer at the first time.

According to some embodiments, the cellular base station is further configured to: receive, from the wireless device, an indication of a preferred discontinuous reception (DRX) cycle length for use by the wireless device in a RRC inactive state; determine a DRX cycle length for use by the wireless device in the RRC inactive state based at least in part on the indication of the preferred DRX cycle length for use by the wireless device in the RRC inactive state; and utilize the determined DRX cycle length for the wireless device when the wireless device is in the RRC inactive state.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A yet further exemplary embodiment may include a non-transitory computer accessible memory medium comprising program instructions which, when executed at a device, cause the device to implement any or all parts of any of the preceding examples.

A still further exemplary embodiment may include a computer program comprising instructions for performing any or all parts of any of the preceding examples.

Yet another exemplary embodiment may include an apparatus comprising means for performing any or all of the elements of any of the preceding examples.

Still another exemplary embodiment may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus, comprising a processing element configured to cause a user-equipment (UE) device to:
    establish a radio resource control (RRC) connection with a cellular base station;
    provide an indication to the cellular base station of a UE-preferred discontinuous reception (DRX) cycle length for use by the UE device in an RRC inactive state; and
    responsive to providing the indication of the UE-preferred DRX cycle length, configure a DRX cycle length for use by the UE device in the RRC inactive state.

2. The apparatus of claim 1, wherein the processing element is further configured to cause the UE device to:
    while in an RRC connected state, receive an RRCConnectionRelease message from the base station and transition to the RRC inactive state; and
    perform inactive DRX monitoring with a periodicity corresponding to the configured DRX cycle length.

3. The apparatus of claim 1, wherein the processing element is further configured to cause the UE device to:
  receive an indication of a network-preferred DRX cycle length from the cellular base station; and
  determine the configured DRX cycle length to be a lower one of the UE-preferred DRX cycle length and the network-preferred DRX cycle length.

4. The apparatus of claim 1,
  wherein the indication of the UE-preferred DRX cycle length is provided within an attach request or a radio access network (RAN) notification area (RNA) update request.

5. The apparatus of claim 1,
  wherein the indication of the UE-preferred DRX cycle length is provided while the UE is in an RRC idle state.

6. The apparatus of claim 1, wherein the processing element is further configured to cause the UE device to:
  receive an indication of the DRX cycle length for use by the UE device in the RRC inactive state from the cellular base station, wherein configuring the DRX cycle length is performed responsive to receiving the indication.

7. The apparatus of claim 1,
  wherein the UE device communicates using a $5^{th}$ generation New Radio (5G NR) radio access technology (RAT), and
  wherein the cellular base station comprises a gNodeB (gNB).

8. A user equipment (UE) device, comprising:
  at least one antenna;
  a radio operably coupled to the at least one antenna; and
  a processing element operably coupled to the radio;
  wherein the processing element is configured to execute program instructions to cause the UE device to:
    establish a radio resource control (RRC) connection with a cellular base station;
    provide an indication to the cellular base station of a UE-preferred discontinuous reception (DRX) cycle length for use by the UE device in an RRC inactive state; and
    responsive to providing the indication of the UE-preferred DRX cycle length, configure a DRX cycle length for use by the UE device in the RRC inactive state.

9. The UE device of claim 8, wherein the program instructions are further executable to cause the UE device to:
  while in an RRC connected state, receive an RRCConnectionRelease message from the base station and transition to the RRC inactive state; and
  perform inactive DRX monitoring with a periodicity corresponding to the configured DRX cycle length.

10. The UE device of claim 8, wherein the program instructions are further executable to cause the UE device to:
  receive an indication of a network-preferred DRX cycle length from the cellular base station; and
  determine the configured DRX cycle length to be a lower one of the UE-preferred DRX cycle length and the network-preferred DRX cycle length.

11. The UE device of claim 8,
  wherein the indication of the UE-preferred DRX cycle length is provided within an attach request or a radio access network (RAN) notification area (RNA) update request.

12. The UE device of claim 8,
  wherein the indication of the UE-preferred DRX cycle length is provided while the UE is in an RRC idle state.

13. The UE device of claim 8, wherein the program instructions are further executable to cause the UE device to:
  receive an indication of the DRX cycle length for use by the UE device in the RRC inactive state from the cellular base station, wherein configuring the DRX cycle length is performed responsive to receiving the indication.

14. The UE device of claim 8,
  wherein the UE device communicates using a $5^{th}$ generation New Radio (5G NR) radio access technology (RAT), and
  wherein the cellular base station comprises a gNodeB (gNB).

15. A method, comprising:
  by a user equipment (UE) device:
    establishing a radio resource control (RRC) connection with a cellular base station;
    providing an indication to the cellular base station of a UE-preferred discontinuous reception (DRX) cycle length for use by the UE device in an RRC inactive state; and
    responsive to providing the indication of the UE-preferred DRX cycle length, configuring a DRX cycle length for use by the UE device in the RRC inactive state.

16. The method of claim 15, further comprising:
  while in an RRC connected state, receiving an RRCConnectionRelease message from the base station and transition to the RRC inactive state; and
  performing inactive DRX monitoring with a periodicity corresponding to the configured DRX cycle length.

17. The method of claim 15, further comprising:
  receiving an indication of a network-preferred DRX cycle length from the cellular base station; and
  determining the configured DRX cycle length to be a lower one of the UE-preferred DRX cycle length and the network-preferred DRX cycle length.

18. The method of claim 15,
  wherein the indication of the UE-preferred DRX cycle length is provided within an attach request or a radio access network (RAN) notification area (RNA) update request.

19. The method of claim 15,
  wherein the indication of the UE-preferred DRX cycle length is provided while the UE is in an RRC idle state.

20. The method of claim 15, further comprising:
  receiving an indication of the DRX cycle length for use by the UE device in the RRC inactive state from the cellular base station, wherein configuring the DRX cycle length is performed responsive to receiving the indication.

* * * * *